(12) United States Patent
Chen (10) Patent No.: US 7,665,649 B2
(45) Date of Patent: Feb. 23, 2010

(54) DEVICE FOR ASSEMBLING GROUPS OF EYEBROW BEAUTIFYING NEEDLES AND METHOD THEREFOR

(76) Inventor: Cheng-kun Chen, 1Fl., 105, Ching Lung St., Wen San Dist., Taipei (TW)

( * ) Notice: Subject to any disclaimer, the term of this patent is extended or adjusted under 35 U.S.C. 154(b) by 217 days.

(21) Appl. No.: 11/092,926

(22) Filed: Mar. 30, 2005

(65) Prior Publication Data

US 2005/0284784 A1    Dec. 29, 2005

(30) Foreign Application Priority Data

Jun. 23, 2004    (CN) .................. 2004 1 0049969

(51) Int. Cl.
  *B23K 37/00* (2006.01)
  *B65D 83/10* (2006.01)
(52) U.S. Cl. .................. 228/44.3; 206/366; 269/54.3
(58) Field of Classification Search ................ 228/44.3, 228/49.1; 206/366, 383, 380; 269/54.3, 269/48.3, 51; 81/13, 44, 457, 458, 179; 163/6, 163/1, 2, 5
See application file for complete search history.

(56) References Cited

U.S. PATENT DOCUMENTS 4,386,697 A * 6/1983 Zocher .................. 206/383

6,206,270 B1    3/2001 Huang

FOREIGN PATENT DOCUMENTS

TW    304872-85109786    5/1997

\* cited by examiner

*Primary Examiner*—Jessica L Ward
*Assistant Examiner*—Michael Aboagye
(74) *Attorney, Agent, or Firm*—Guice Patents PLLC (57) ABSTRACT

Provided are device for assembling groups of eyebrow beautifying needles and method therefor. The assembling device comprises a base, a sliding block including two resilient members biased between the base and the sliding block, a central fastener for fastening the sliding block on or above the base, a holding assembly comprising a plurality of clamping posts vertically disposed on the base, and a plurality of holes with the sliding blocks passed through. Groups of eyebrow beautifying needles are adapted to insert into holding heads of the clamping posts with needle tips being flush in the holding heads of the clamping posts, and the needles in each group are fastened together by soldering. Moreover, sleeves of different colors or marks may be put on the needle groups for facilitating identifying the number of needles in each group.

7 Claims, 10 Drawing Sheets

DEVICE FOR ASSEMBLING GROUPS OF EYEBROW BEAUTIFYING NEEDLES AND METHOD THEREFOR

BACKGROUND OF THE INVENTION

1. Field of Invention

The present invention relates to eyebrow beautifying needles and more particularly to a device for assembling eyebrow beautifying needles in a plurality of groups marked by different colors for ease of identification and a method therefor.

2. Description of Related Art

Conventionally, solder assembling method and stainless steel sleeve fastening method are used in assembling eyebrow beautifying needles. For the solder assembling method, three needles including a long one are grouped together prior to disposing horizontally in which no fastening device is involved. Next, solder the grouped needles at a suitable position for fastening. However, it is not easy to maintain the needle heads flush in the assembly process. Even once being flush, soldering also tends to damage it. Such eyebrow beautifying needles of poor quality (i.e., not flush) may form different depths in portions of eyebrow, thereby adversely affecting the quality of eyebrow beautification. For stainless steel sleeve fastening method, a stainless steel sleeve is put on the grouped needles prior to disposing horizontally. Next, clamp an annular groove around the needles at a suitable position for fastening. However, the flush needle heads are susceptible to being inclined or not flush due to force exerted in the fastening process or carelessness. This also adversely affects the quality of eyebrow beautification. The stainless steel sleeve fastening method is not applicable to group more than three needles in a unit because the inner needles cannot be fastened. Taiwanese Patent No. 304,872 (prior art I) discloses a method for assembling groups of eyebrow beautifying needles in which an elongate copper base includes a plurality of holes of different diameters, a copper sleeve is adapted to receive a plurality of short needles and a long needle, a sheath is put on one end of the sleeve for sealing the needles, put the sleeve in the hole of the base, place the base in an oven for heating, the sheath is contracted to squeeze the needles, and finally inject glue in a joining portion of the sheath and the needles for fastening.

U.S. Pat. No. 6,206,270 B1 (prior art II) discloses a method for assembling groups of eyebrow beautifying needles in which a plurality of short needles are placed in a vertical hole of a base, a sleeve is put on top ends of the grouped needles, a long needle is inserted into the sleeve wherein all needles are flush at bottom of the hole, place the base in an oven for heating, the sleeve is contracted to squeeze the needles, remove the needles and insert tips of the needles in an aperture of a support for positioning, and finally solder exposed tips of the needles for fastening.

However, both prior patents suffered from several disadvantages as detailed below.

(i) Both the sleeve in prior art I and the hole in prior art II are of fixed diameter. Thus, the purpose of fastening needles cannot be obtained when the needles are inserted. Also, the number of inserted needles is limited. Further, it is difficult of checking whether needles are flush or not. Furthermore, dirt or rust may accumulate or form in bottom of the sleeve or hole. This is not hygienic.

(ii) Either in prior art I (in which the sheath is contracted to squeeze the needles) or in prior art II (in which the needles are inserted in the aperture of a support) no clamping action is taken. Thus, needles tend to displace due to carelessness or any other undesired reasons. The inclined or not flush needles may adversely affect the quality of eyebrow beautification.

(iii) Contraction force is much less than the rigidity of the needles made of steel. As such, a correct positioning of the needles cannot be obtained by contraction by heating. To the worse, contraction by heating may further deteriorate the uneven needles.

(iv) The tips of the needles are relatively small. Also, it is difficult of visually identifying the number of the grouped tips of the needles enclosed by sheath. And in turn, it makes marking them become very difficult and unreliable.

(v) The long eyebrow beautifying needle may incline after insertion. That is, it is difficult of maintaining the long eyebrow beautifying needle in center with short eyebrow beautifying needles surrounded. Further, for making needles flush a person has to use the hand to exert great force to adjust the needles in the sheath. Unfortunately, the purpose may be not obtained because the tips of the needles may be damaged in the adjustment process. Thus, the need for improvement still exists in order to overcome the inadequacies of the prior art.

SUMMARY OF THE INVENTION

It is therefore an object of the present invention to provide an assembling device comprising an elongate base; an elongate sliding block including one or more resilient members biased between the base and the sliding block such that the sliding block is adapted to vertically move relative to the base; a central fastener for fastening the sliding block on or above the base; a holding assembly comprising a plurality of clamping posts vertically disposed on the base; and a hole group comprising a plurality of holes with the sliding blocks passed through; wherein a plurality of groups of eyebrow beautifying needles are adapted to insert into holding heads of the clamping posts with tips of the eyebrow beautifying needles being flush in the holding heads of the clamping posts, and the eyebrow beautifying needles in each group are fastened together by soldering.

In one aspect of the present invention, in a first position the sliding block is rested upon the base by securing the fastener, the resilient members are compressed, and the eyebrow beautifying needles are inserted into the holding heads of the clamping posts for positioning; and in a second position the sliding block is disposed above the base by loosening the fastener, the resilient members are expanded, and the eyebrow beautifying needles are fastened in the holding heads of the clamping posts.

In another aspect of the present invention, the holding head of the clamping post comprises an upper clamping member including a plurality of latched members equally spaced around adapted to fasten the eyebrow beautifying needles inserted thereinto, and a lower opening adapted to enable a person to visually check whether the tips of the eyebrow beautifying needles inserted into the holding head of the clamping post are flush or not.

It is another object of the present invention to provide an assembling method comprising the steps of (1) grouping a plurality of eyebrow beautifying needles into a plurality of groups with a sliding block being fastened on a base by a central fastener and one or more resilient members biased between the base and the sliding block being compressed; (2) inserting the grouped eyebrow beautifying needles into a plurality of clamping posts projecting from the base through a plurality of holes of the sliding block wherein each clamping post includes a lower opening for enabling a user to visually check whether tips of the eyebrow beautifying needles of each group in a holding head of the clamping post are flush or not; (3) loosening the fastener to hoist the sliding blocks by upward expanding the resilient members wherein the upward movement of the sliding blocks will be stopped when edges of the holes contact the holding heads of the clamping posts for fastening the eyebrow beautifying needles of each group in the holding head of the clamping post; (4) soldering upper portions of the eyebrow beautifying needles of each group by means of point solders for fastening and forming a plurality of groups of grouped eyebrow beautifying needles; (5) putting a plurality of sleeves of different colors on the groups of grouped eyebrow beautifying needles for facilitating identifying the number of the grouped eyebrow beautifying needles in each group; and (6) subjecting the groups of the grouped eyebrow beautifying needles with the sleeves put thereon to a heating process for contraction.

In yet another aspect of the present invention, between the step (4) and the step (5) further comprises the steps of (4-1) screwing down the fastener until the sliding block rests upon top of the base with the resilient members being compressed; (4-2) removing the groups of the grouped eyebrow beautifying needles and sinking same in a water vessel for ultrasonic cleaning; (4-3) inserting the clean groups of the grouped eyebrow beautifying needles into the clamping posts; and (4-4) loosening the fastener to hoist the sliding blocks by upward expanding the resilient members wherein the upward movement of the sliding blocks will be stopped when the edges of the holes contact the holding heads of the clamping posts for fastening the eyebrow beautifying needles of each group in the holding head of the clamping post;

The above and other objects, features and advantages of the present invention will become apparent from the following detailed description taken with the accompanying drawings.

DETAILED DESCRIPTION OF THE INVENTION

Figure 1:
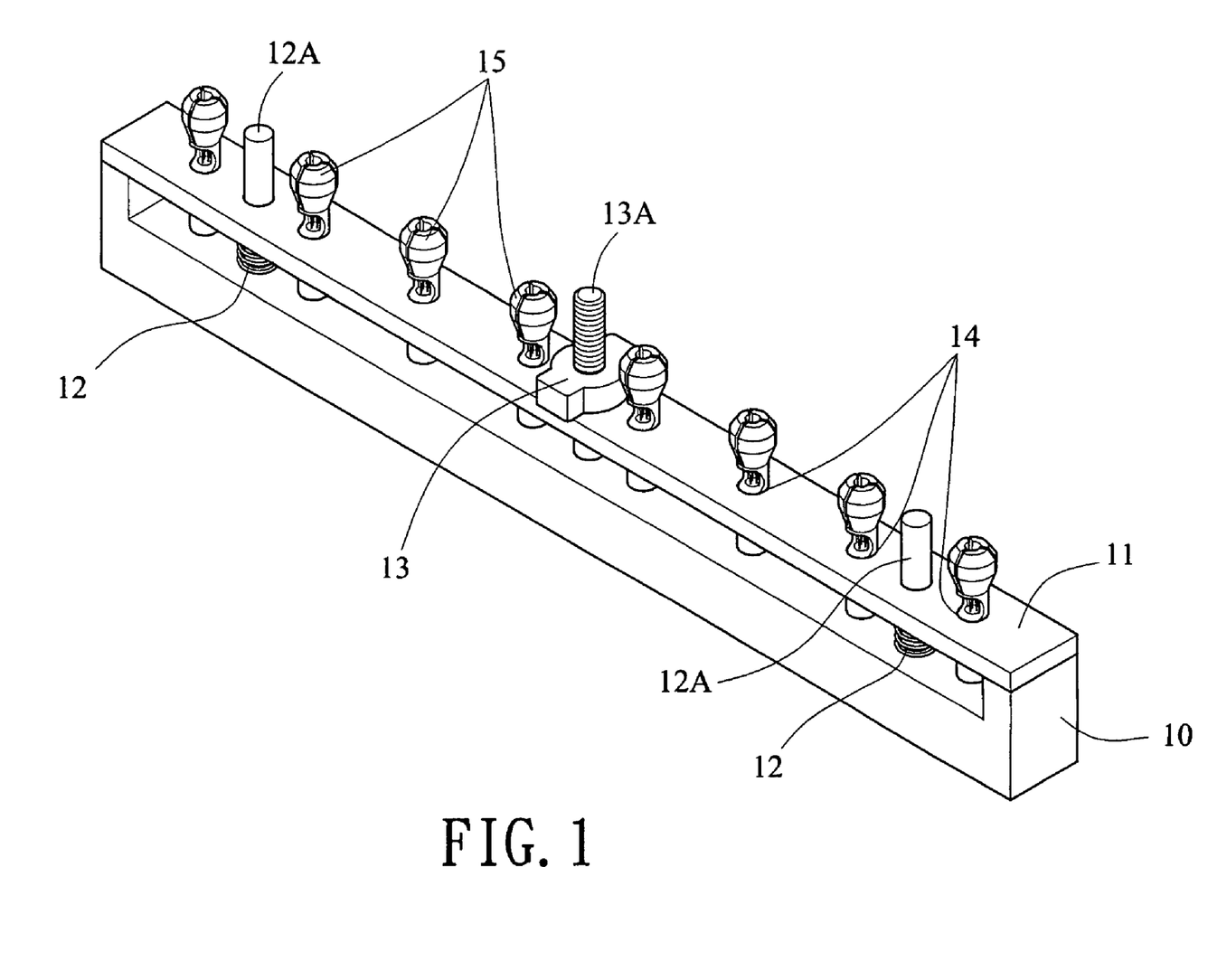
FIG. 1 is a perspective view of a preferred embodiment of device for assembling groups of eyebrow beautifying needles according to the invention.
Figure 2:
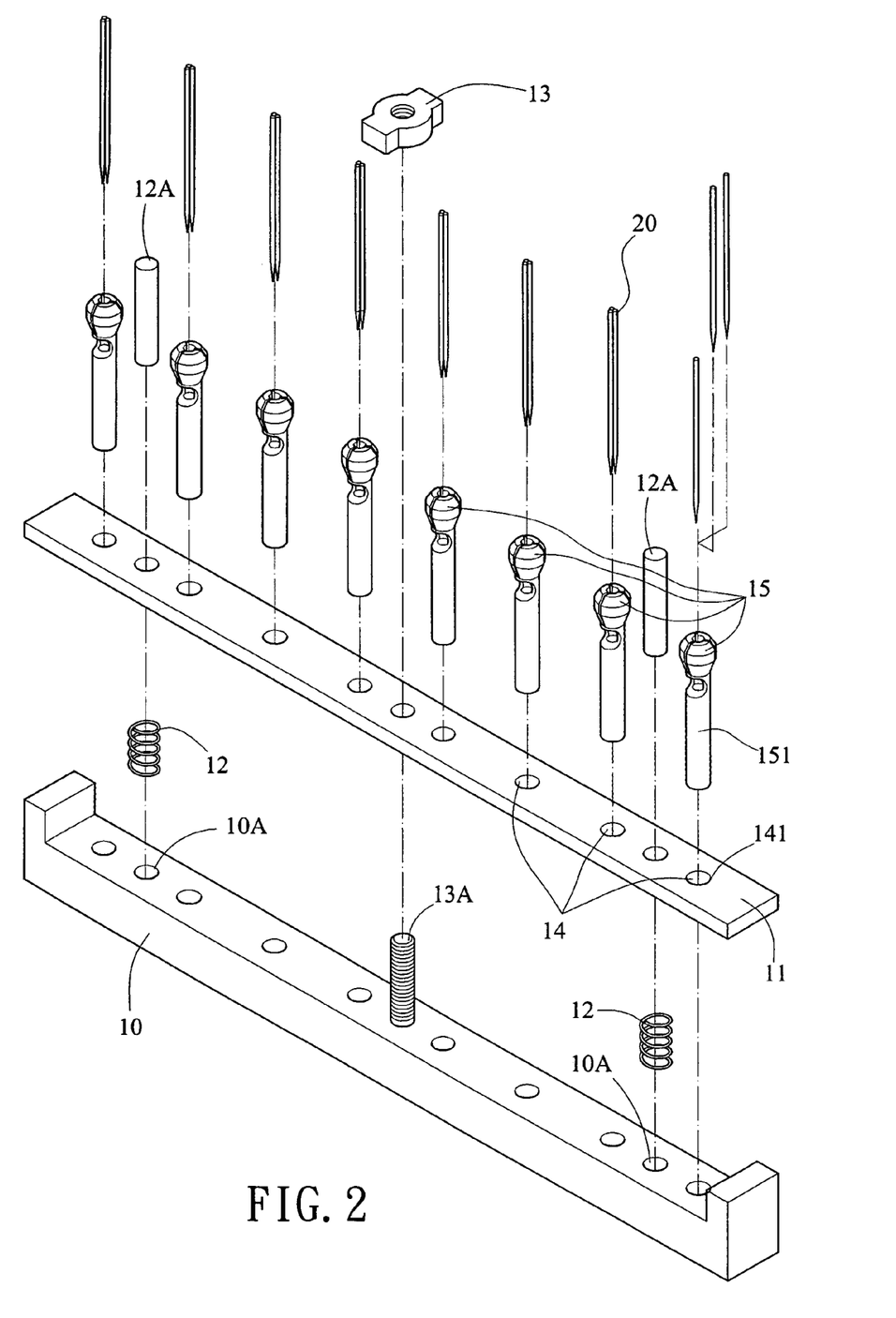
FIG. 2 is an exploded view of FIG. 1 where a plurality of groups of eyebrow beautifying needles are about to insert into the clamping posts.

Referring to FIGS. 1 and 2, there is shown a device for assembling groups of eyebrow beautifying needles in accordance with a preferred embodiment of the invention comprising an elongate base 10 of U-section, an elongate sliding block 11 including a hole group 14, two resilient members (e.g., springs) 12, a nut 13, and a holding assembly 15. Each component is discussed in detailed below. The hole group 14 comprises a plurality of holes 141 through the sliding block 11. The holding assembly 15 comprises a plurality of vertical clamping posts 151 for clamping a plurality of groups of eyebrow beautifying needles 20 in its head. Each clamping post 151 is adapted to insert through the hole 141 into a corresponding aperture 10A on top of the horizontal section of the base 10 for positioning. A peg 12A is inserted through the hole 141 and either resilient member 12 into a corresponding aperture 10A on top of the horizontal section of the base 10 for positioning. A nut 13 is threadedly secured to a threaded stem 13A projecting from top of the horizontal section of the base 10 through the hole 141 for elastically fastening the sliding block 11 on the base 10.

Figure 3:
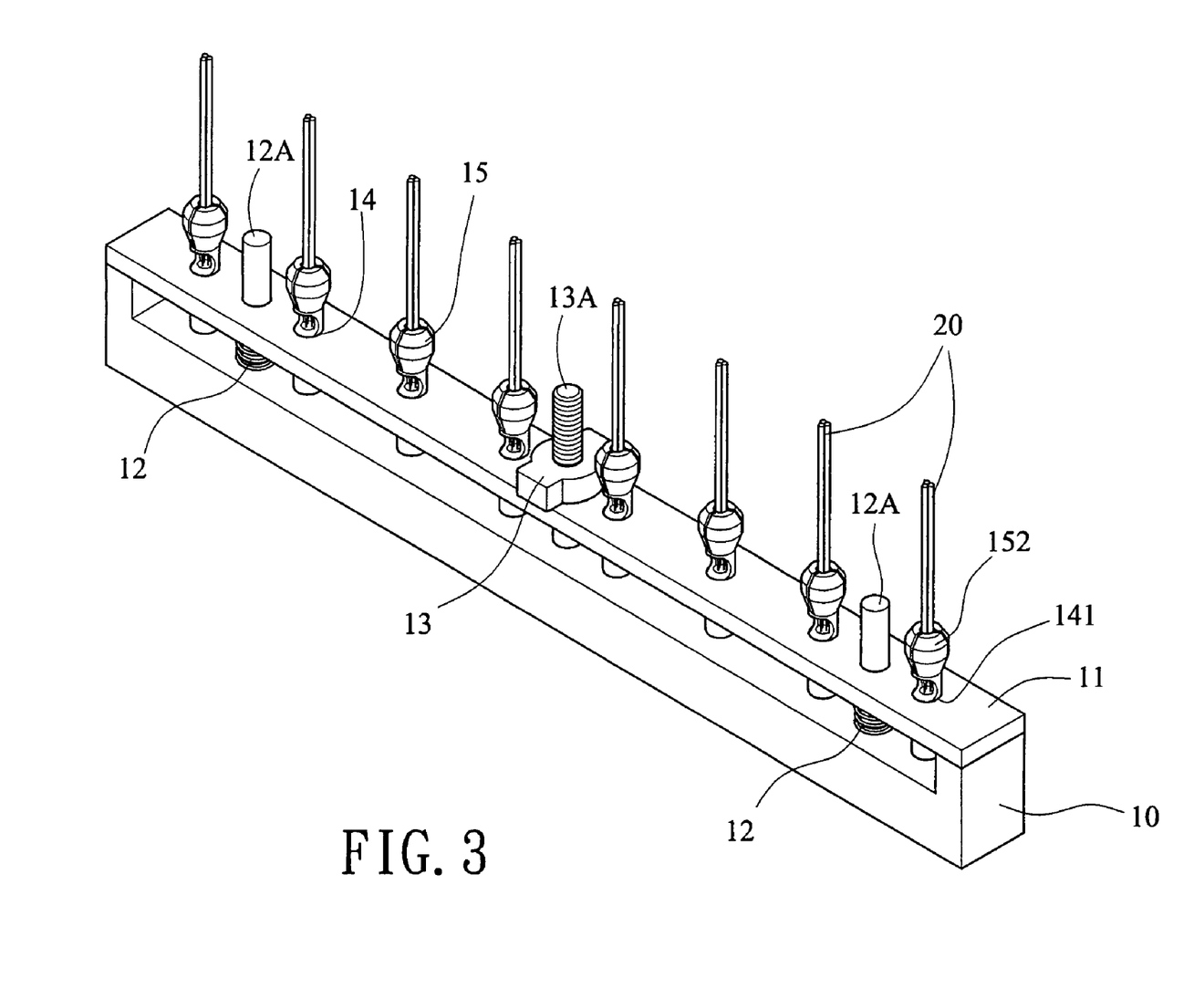
FIG. 3 is a perspective view of the assembled device and the eyebrow beautifying needles of FIG. 2.

Referring to FIG. 3, the plurality of groups of eyebrow beautifying needles 20 have been inserted into the heads of the clamping posts 151. The sliding block 11 is fastened by the nut 13. In this position, the resilient members 12 are compressed.

Figure 4:
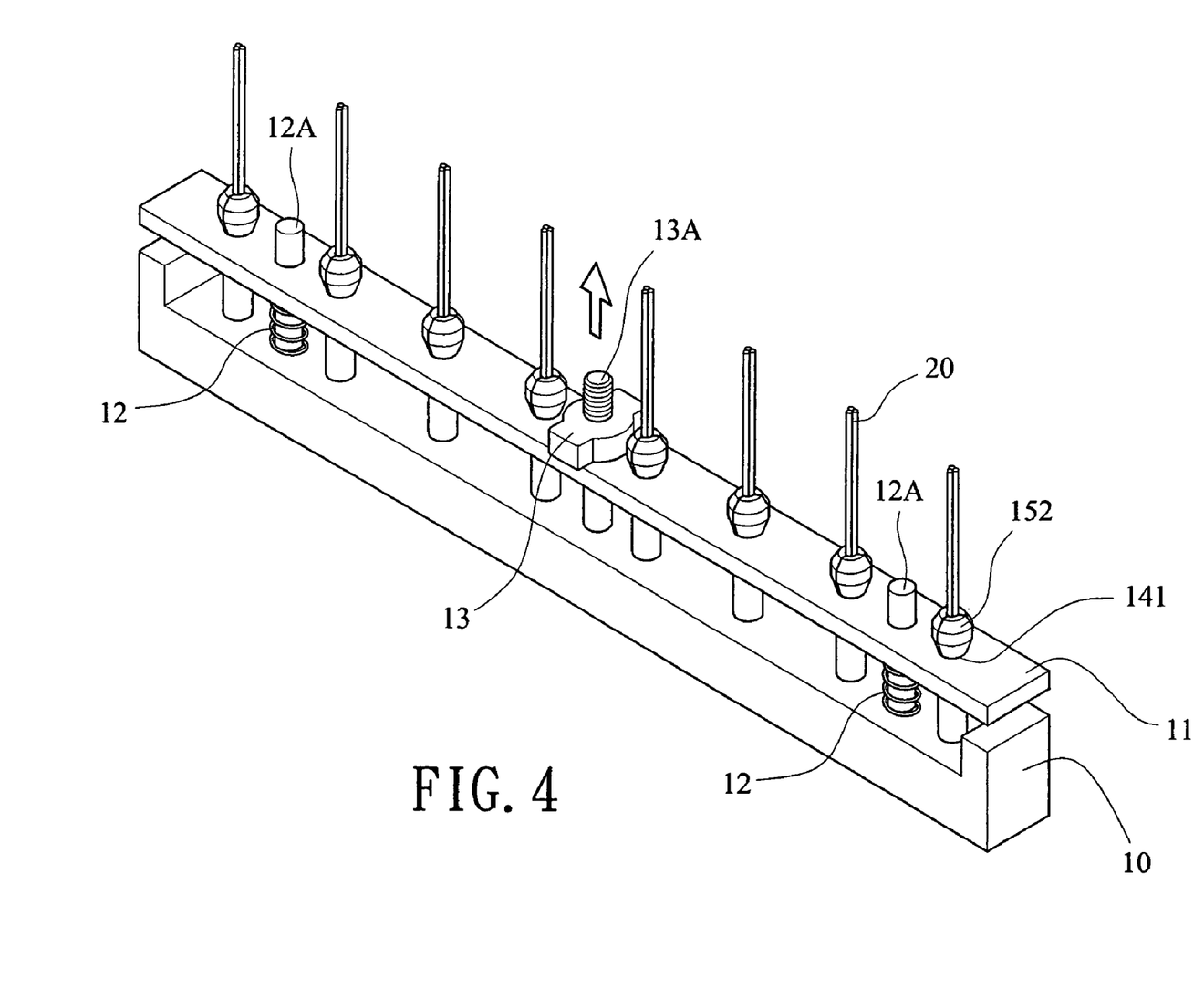
FIG. 4 is a view similar to FIG. 3 where the sliding block hoists due to loosening of the nut and upward expansion of the resilient members, and the eyebrow beautifying needles are thus fastened.

Referring to FIG. 4, the sliding block 11 hoists because the nut 13 has been loosened and then the resilient members 12 urge upward by expansion. The upward movement of the sliding block 11 will be stopped when edges of the holes 141 contact the enlarged heads of the clamping posts 151. At this position, the groups of eyebrow beautifying needles 20 are fastened in the heads of the clamping posts 151.

Figure 5:
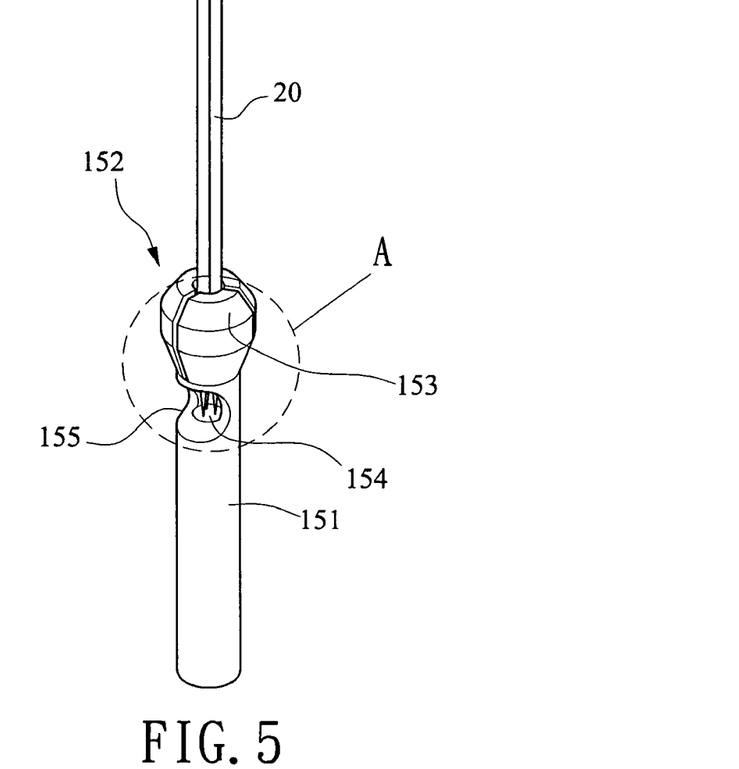
FIG. 5 is a perspective view of the clamping post with three needles fastened therein.
Figure 5A:
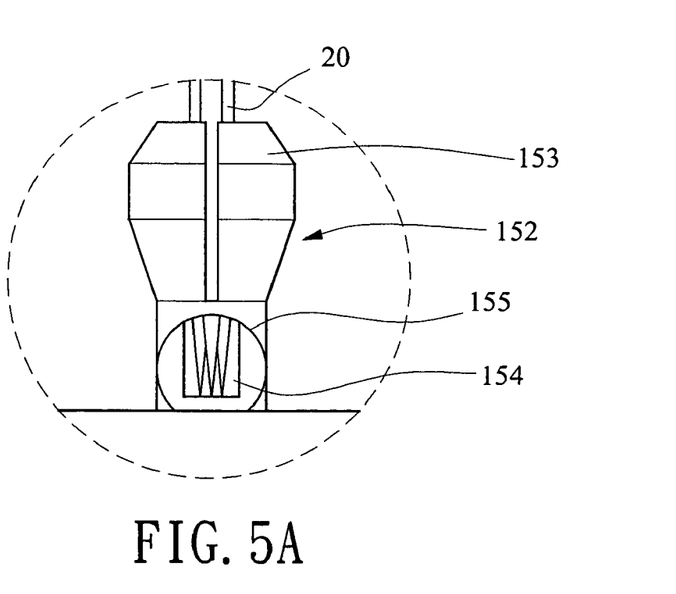
FIG. 5A is a detailed view of the area in circle A in FIG. 5.

Referring to FIGS. 5 and 5A, the head 152 of the clamping post 151 comprises three upper latched members 153 equally spaced around for clamping the inserted needles 20, and a lower inspection opening 155. A user thus can visually check whether tips of the needles 20 in an aperture 154 defined by the latched members 153 are flush or not through the opening 155.

Referring to FIGS. 6A to 6J, they schematically depict a process for assembling a plurality of groups of eyebrow beautifying needles 20 according to the invention.

Figure 6A:
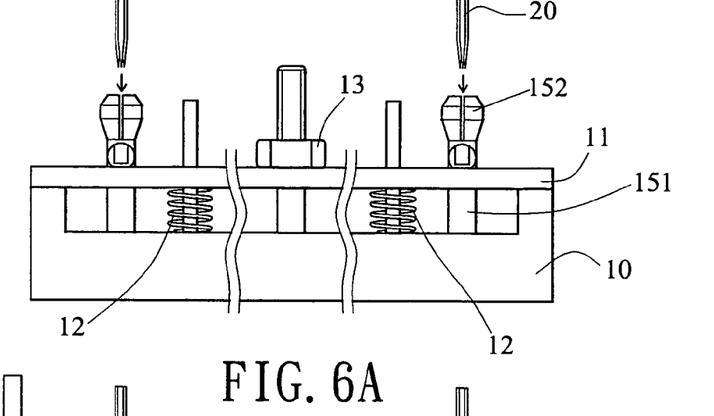
FIGS. 6A to 6J are schematic side views of the device for depicting a process for assembling groups of eyebrow beautifying needles according to the invention.

In FIG. 6A, a plurality of eyebrow beautifying needles 20 are grouped into a plurality of groups and the sliding block 11 is fastened on the base 10 by the nut 13. In this position, the resilient members 12 are compressed.

Figure 6B:
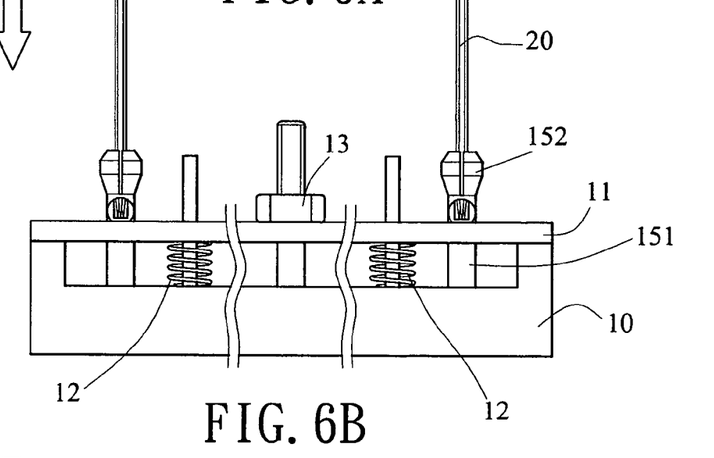

In FIG. 6B, the grouped eyebrow beautifying needles 20 are inserted into the clamping posts 151. A user may visually check whether tips of the needles 20 in the aperture 154 of the head 152 are flush or not through the opening 155.

Figure 6C:
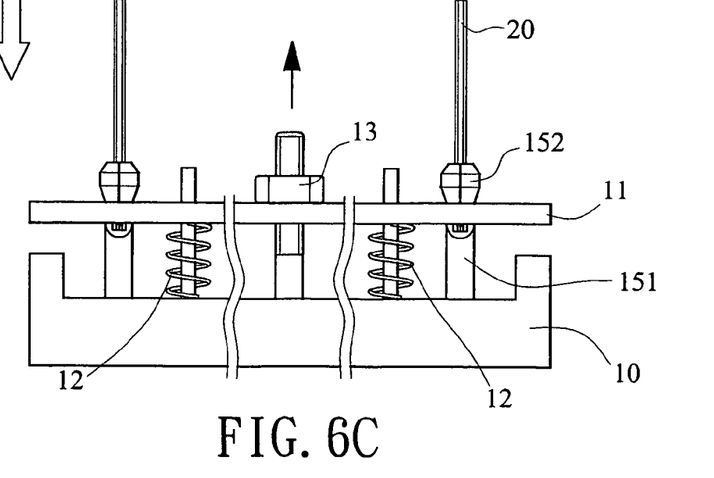

In FIG. 6C, loosen the nut 13 and then the sliding block 11 hoists due to the upward expansion of the resilient members 12. The upward movement of the sliding block 11 will be stopped when the edges of the holes 141 contact the enlarged heads 152 of the clamping posts 151. At this position, the groups of eyebrow beautifying needles 20 are fastened in the heads 152 of the clamping posts 151.

Figure 6D:
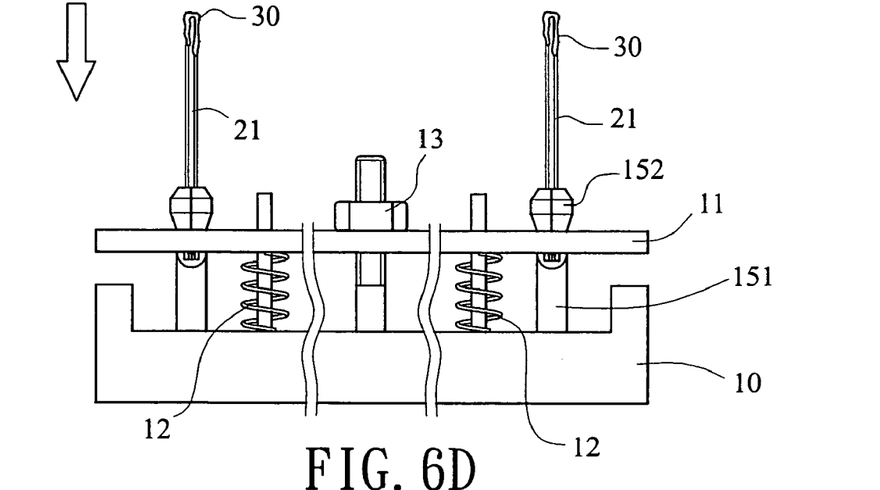

In FIG. 6D, solder upper portions of the grouped eyebrow beautifying needles 20 by means of point solders 30 so as to form soldered upper portion and fasten the grouped eyebrow beautifying needles 20 together. As a result, a plurality of groups of grouped needles 21 having been soldered on the upper portion are formed.

Figure 6E:
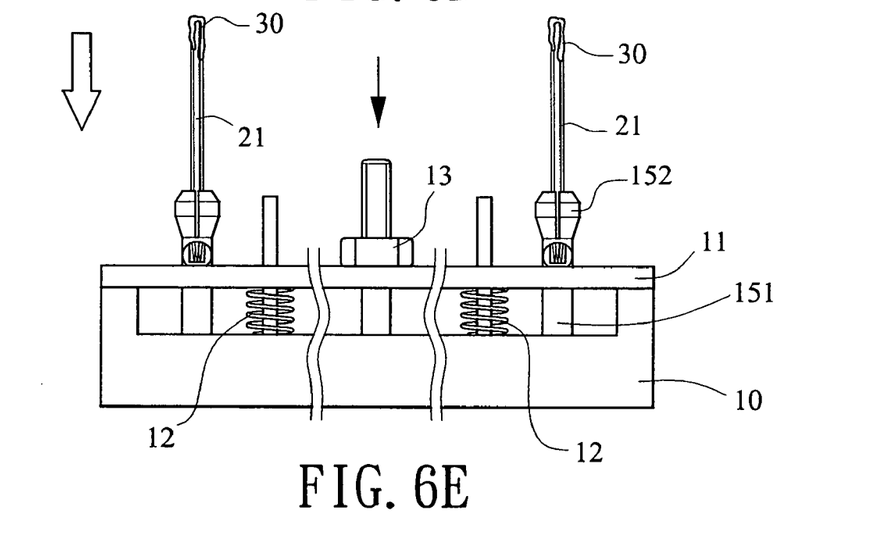

In FIG. 6E, screw down the nut 13 until the sliding block 11 rests upon top of the base 10 again. In this position, the resilient members 12 are compressed again.

Figure 6F:
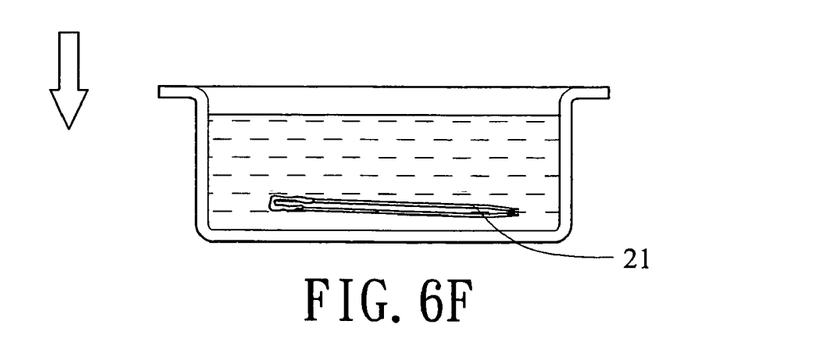

In FIG. 6F, remove the grouped needles 21 and sink them in a water vessel for ultrasonic cleaning.

Figure 6G:
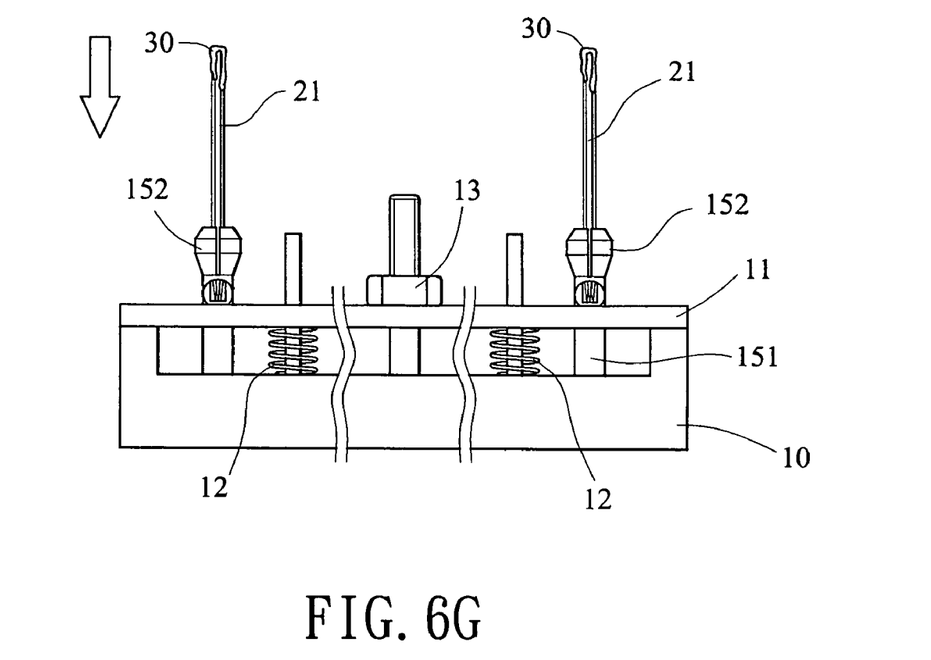

In FIG. 6G, insert the clean grouped needles 21 into the clamping posts 151 again.

Figure 6H:
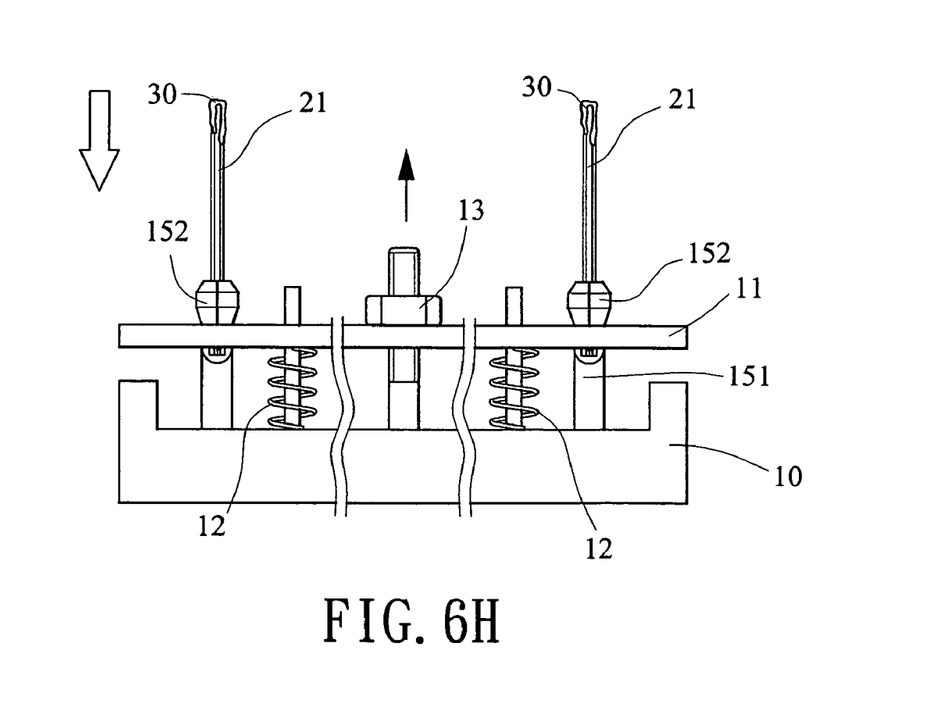

In FIG. 6H, loosen the nut 13 and then the sliding block 11 hoists due to the upward expansion of the resilient members 12. The upward movement of the sliding block 11 will be stopped when the edges of the holes 141 contact the enlarged heads 152 of the clamping posts 151. At this position, the grouped needles 21 are fastened in the heads 152 of the clamping posts 151.

Figure 6I:
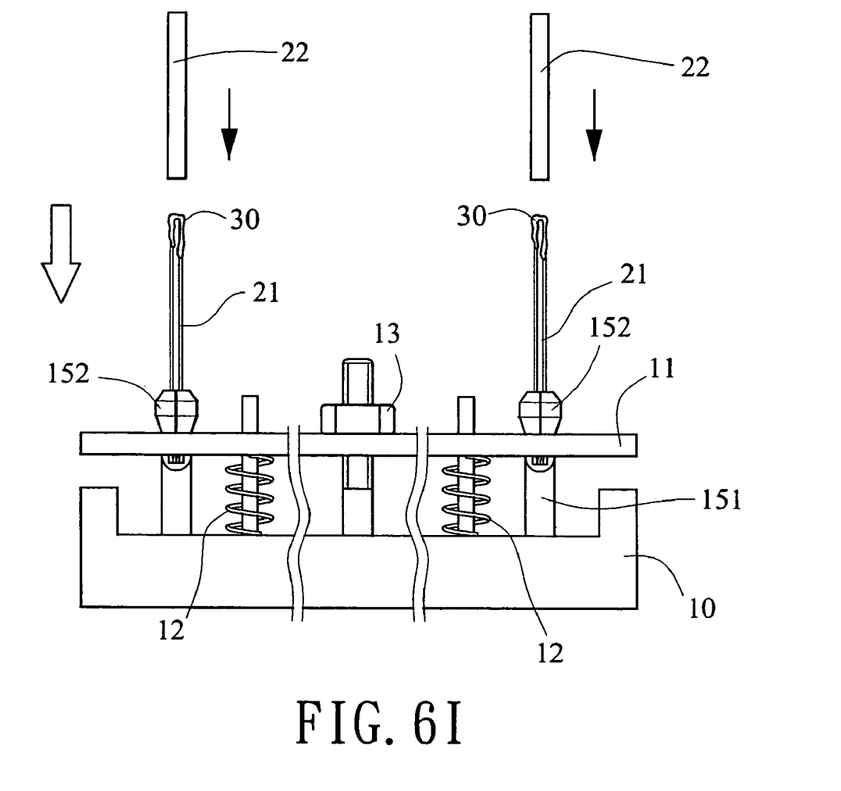
Figure 6J:
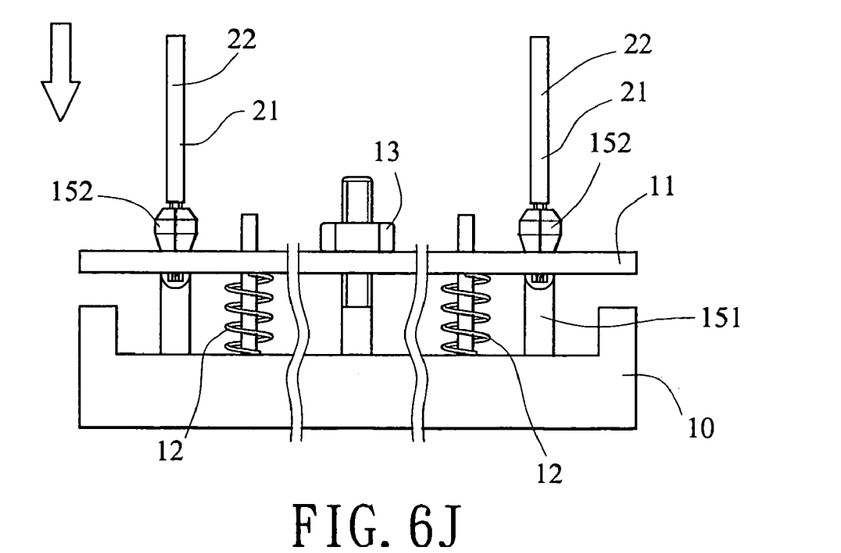

In FIGS. 6I and 6J, snugly put a plurality of plastic sleeves 22 of different colors on the soldered grouped needles 21. Alternatively, snugly put a plurality of sleeves 22 with identifying numerals, with identifying marks or with identifying colors on the grouped needles 21. The distinguishable sleeve 22 enables a user to easily identify the number of needles in each produced grouped needle 21.

Note that the mounted sleeves 22 are subjected to a heating process for contraction so as to further fasten the grouped needles 21 firmly together as one unit. Also, the ultrasonic cleaning step including steps described in FIGS. 6F, 6G, and 6H can be eliminated if environment is sufficiently clean.

Figure 7:
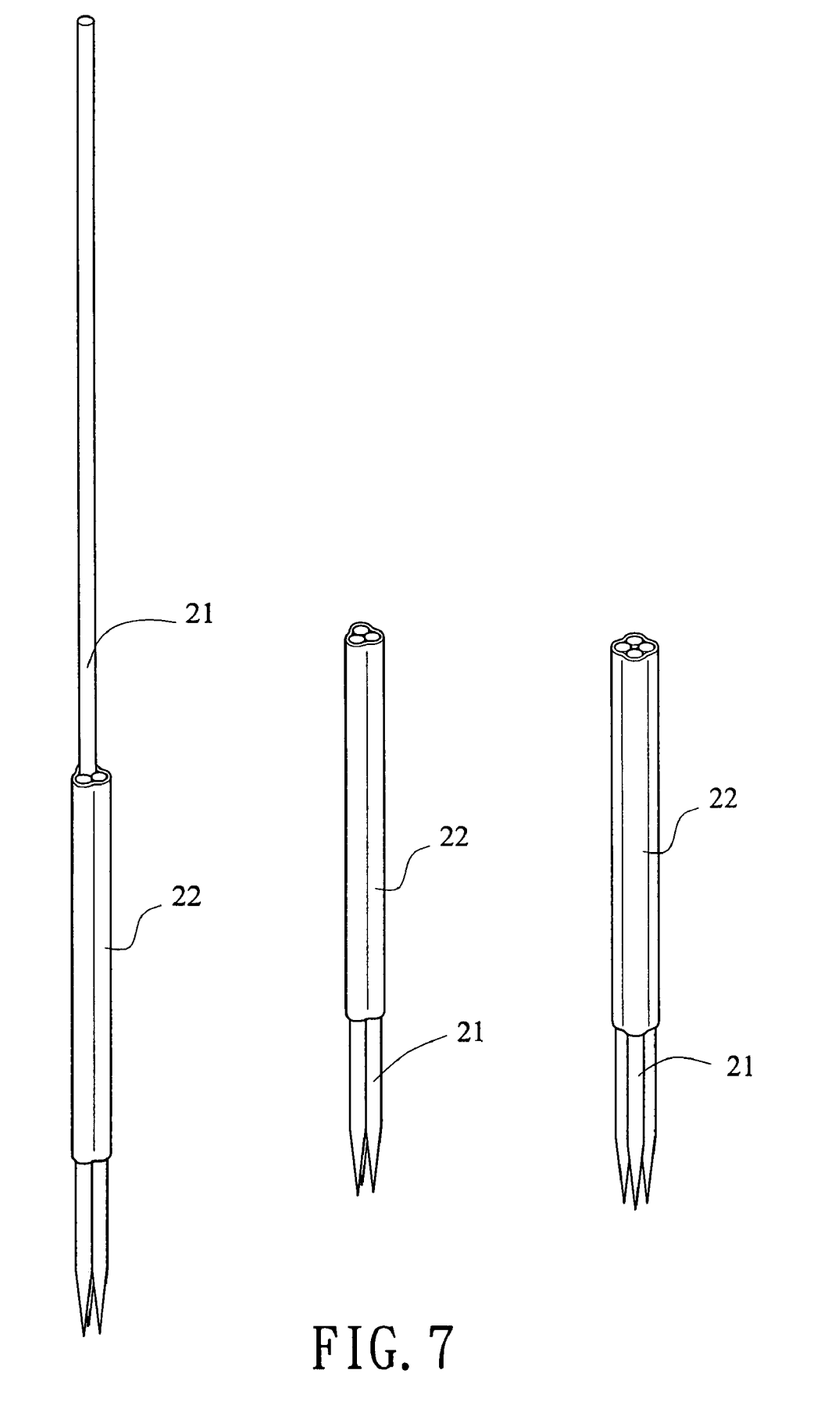
FIG. 7 is a perspective view of three different groups of eyebrow beautifying needles formed by the process.

Referring to FIG. 7, three different groups of grouped needles 21 are formed by the process of the invention. As shown, the left one comprises a long grouped needle 21 and two short grouped needles 21, the middle one comprises three short grouped needles 21, and the right one comprises four short grouped needles 21. In each one the sleeve 22 is fastened by contraction. Most importantly, tips of the grouped needles 21 are flush.

While the invention herein disclosed has been described by means of specific embodiments, numerous modifications and variations could be made thereto by those skilled in the art without departing from the scope and spirit of the invention set forth in the claims.

What is claimed is:

1. An assembling device comprising:
    an elongate base;
    an elongate sliding block including one or more resilient members biased between the base and the sliding block such that the sliding block is adapted to vertically move relative to the base;
    a central fastener for fastening the sliding block on or above the base;
    a holding assembly comprising a plurality of clamping posts vertically disposed on the base; and
    a hole group comprising a plurality of holes that pass through the sliding block
    wherein a plurality of groups of eyebrow beautifying needles are adapted to insert into holding heads of the clamping posts with tips of the eyebrow beautifying needles being flush in the holding heads of the clamping posts, and the eyebrow beautifying needles in each group are fastened together by soldering.

2. The assembly device of claim 1, wherein each resilient member is a spring.

3. The assembly device of claim 1, wherein the fastener is a bolt and nut combination.

4. The assembly device of claim 1, wherein in a first position the sliding block is rested upon the base by securing the fastener, the resilient members are compressed, and the eyebrow beautifying needles are inserted into the holding heads of the clamping posts for positioning; and in a second position the sliding block is disposed above the base by loosening the fastener, the resilient members are expanded, and the eyebrow beautifying needles are fastened in the holding heads of the clamping posts.

5. The assembly device of claim 1, wherein the holding head of the clamping post comprises an upper clamping member and a lower opening.

6. The assembly device of claim 5, wherein the clamping member comprises a plurality of latched members equally spaced around adapted to fasten the eyebrow beautifying needles inserted thereinto.

7. The assembly device of claim 5, wherein the opening is adapted to enable a person to visually check whether the tips of the eyebrow beautifying needles inserted into the holding head of the clamping post are flush or not.

* * * * *